N. H. ANDERSON.
TYPE WRITING MACHINE.
APPLICATION FILED JUNE 5, 1908.

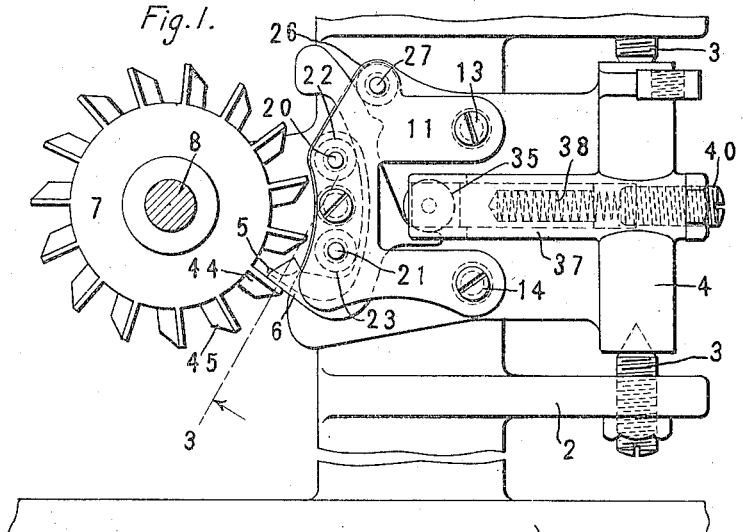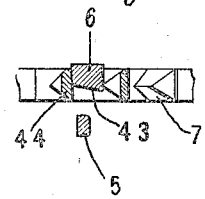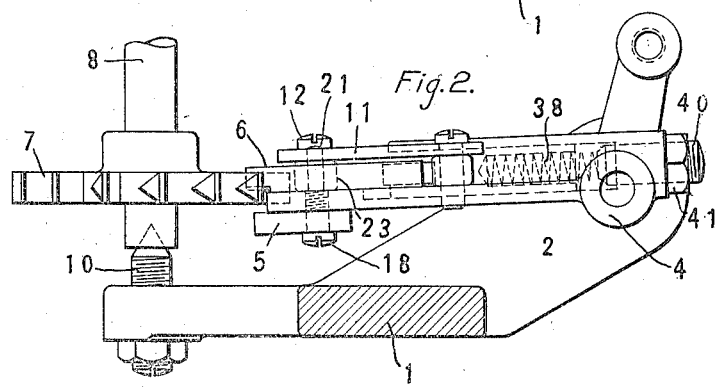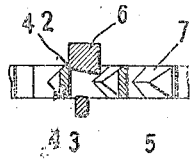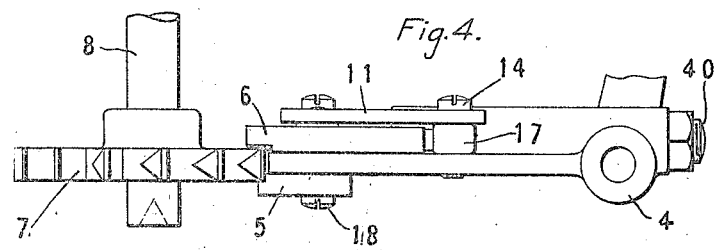

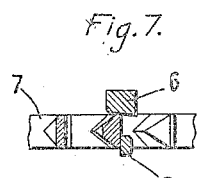
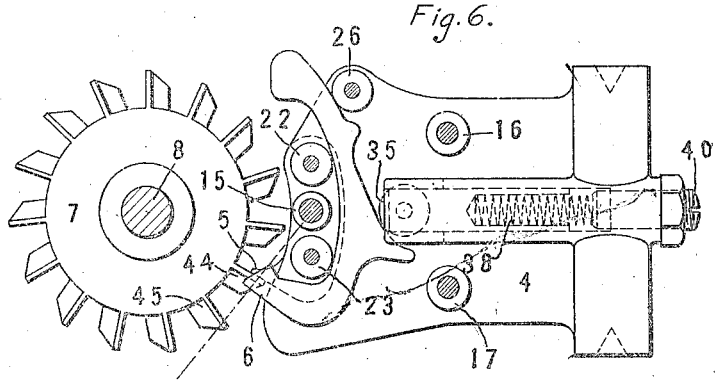
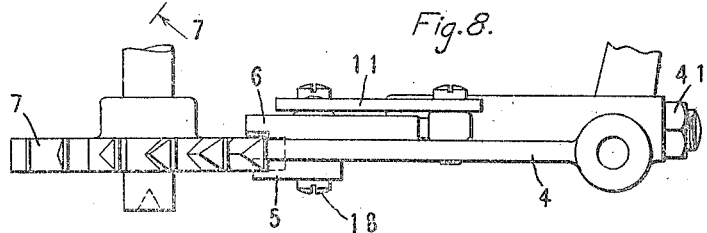
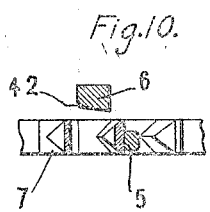
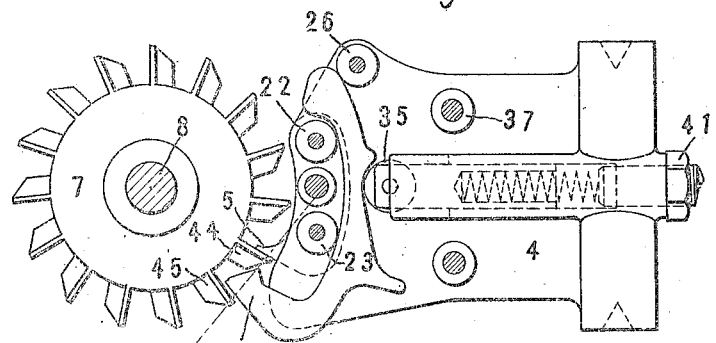
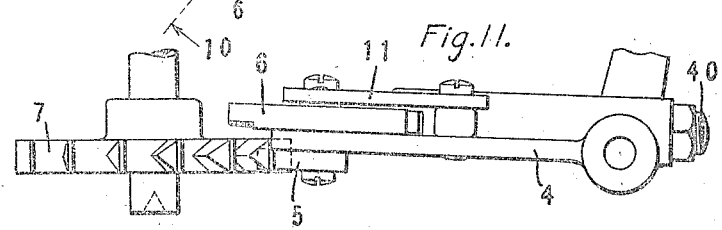

1,123,463.

Patented Jan. 5, 1915.
4 SHEETS—SHEET 3.

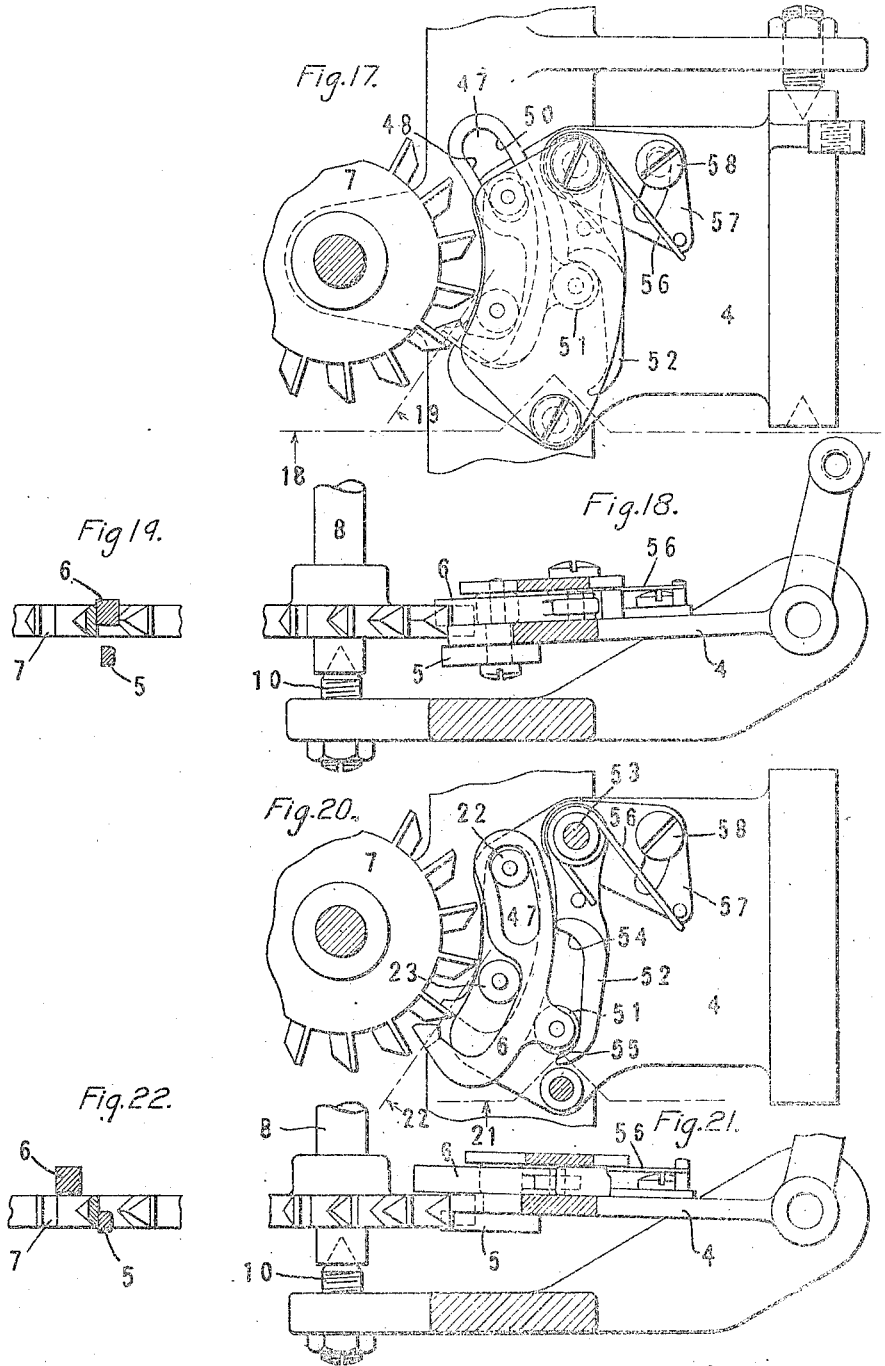

UNITED STATES PATENT OFFICE.

NILS H. ANDERSON, OF HARTFORD, CONNECTICUT, ASSIGNOR, BY MESNE ASSIGNMENTS, TO THE NOISELESS TYPEWRITER COMPANY, OF MIDDLETOWN, CONNECTICUT, A CORPORATION OF CONNECTICUT.

TYPE-WRITING MACHINE.

1,123,463.   Specification of Letters Patent.   Patented Jan. 5, 1915.

Application filed June 5, 1908. Serial No. 436,754.

*To all whom it may concern:*

Be it known that I, NILS H. ANDERSON, a citizen of the United States, residing at Hartford, in the county of Hartford and State of Connecticut, have invented certain new and useful Improvements in Type-Writing Machines, of which the following is a full, clear, and exact description, such as will enable others skilled in the art to which it appertains to make and use the same.

This invention relates to typewriting machines, and more particularly to a machine of a type which is designed to effect writing without producing noise.

In typewriting machines as hitherto constructed, a large part of the noise incidental to the operation thereof has been produced by the clicking of the parts of the escapement mechanism, and one of the objects of my present invention is to overcome this objection and render the operation of the escapement mechanism substantially noiseless.

Another object is to provide an escapement which will be speedy, positive and accurate in operation.

A further object of the invention is to provide escapement mechanism wherein friction between the bearing surfaces of relatively movable parts is reduced to a minimum. Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 12:
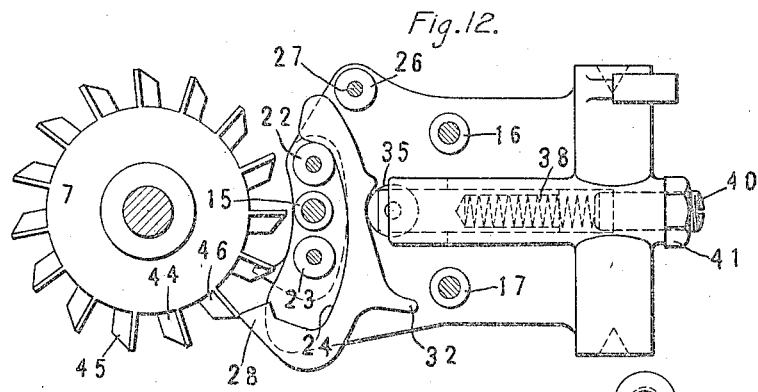
Figure 13:
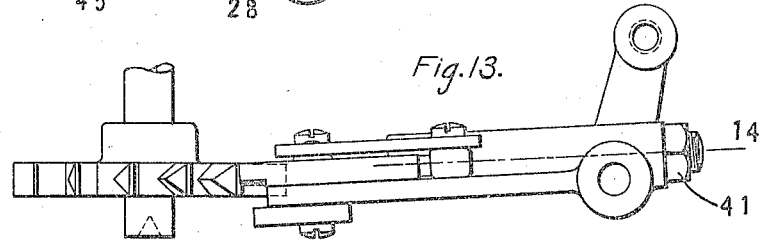
Figure 15:
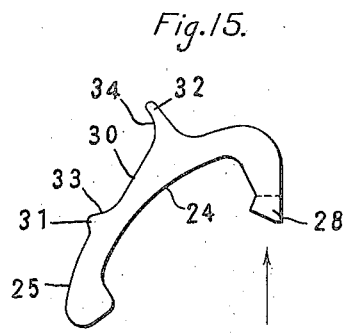
Figure 14:
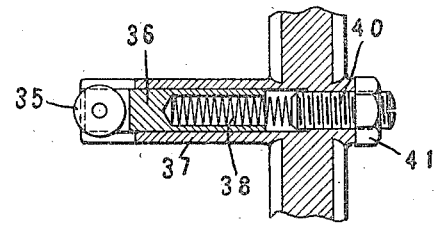
Figure 16:
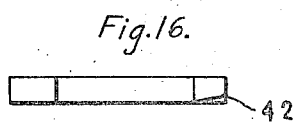

In the accompanying drawings, wherein are illustrated two of various possible embodiments of my invention, Figure 1 is a plan view showing the preferred embodiment of the escapement mechanism; Fig. 2 is a side elevation thereof; Fig. 3 is a section taken on line 3 of Fig. 1, looking in the direction of the arrow; Fig. 4 is a side view showing the escapement mechanism in a slightly different position than in Fig. 4; Fig. 5 a section on line 3 of Fig. 1, with the parts in the same position as in Fig. 4; Fig. 6 is a plan view, showing the parts of the escapement in still another position; Fig. 7 is a sectional view, taken on line 7 of Fig. 6; Fig. 8 is a side elevation of the mechanism shown in Fig. 6; Fig. 9 is a plan view of the escapement mechanism, showing the loose dog free from one tooth of the escapement wheel and moved in position to be engaged by the next tooth thereof; Fig. 10 is a sectional view taken on line 10, Fig. 9; Fig. 11 is a side view of the mechanism shown in Fig. 9; Figs. 12 and 13, respectively, show plan and side views of the escapement mechanism, with the parts in the position assumed when the back-spacing mechanism is operated to rotate the escapement wheel in a reverse direction; Fig. 14 is a section taken on line 14 of Fig. 13, showing the means for actuating the movable feed-dog; Figs. 15 and 16 show detail plan and end views, respectively, of the movable feed-dog; Fig. 17 is a plan view of a different embodiment of my invention; Fig. 18 is a side elevation thereof, partly in section and taken on line 18, Fig. 17. Fig. 19 is a section taken on line 19, Fig. 17; and Figs. 20, 21 and 22 are plan, side and sectional views of this embodiment, the parts being shown in a different position from that shown in Fig. 17.

Referring now to the drawings, and particularly to the embodiment of my invention illustrated in Figs. 1 to 16, inclusive, 1 indicates a portion of the framing of the machine which supports, as by means of lugs 2 and pivot screws 3, a vibratory rocker member 4. This rocker member carries a fixed or detaining dog 5 and a loose or feed-dog 6 which coöperates with an escapement wheel 7 mounted upon a shaft 8, one end of which is shown mounted upon a pivotal support 10 suitably supported in the framework of the machine. Shaft 8 is adapted to carry a feed-pinion which meshes with the carriage-feed rack of the machine, these latter parts not being shown herein.

Rocker member 4, in the present instance, is provided with a cover plate 11 which is spaced from the rocker member and held in position thereon, as by means of screws 12, 13 and 14, spacing bushings 15, 16 and 17 being positioned upon these pins and interposed between the rocker member and the cover plate to hold the latter in fixed position. The fixed dog 5 is held in position upon the rocker member by means of clamp-screws, one of which is shown at 18 threaded into the rocker member, said clamp-screws having reduced portions or pins 20 and 21 extended between the rocker member and cover portion 11 which form pivotal supports for rollers 22 and 23, respectively, which are interposed between rocker member and said cover portion. Pivot pins 20 and 21 are disposed upon said rocker member in an arc having its center at the axis of the escapement wheel, and rollers 22 and 23 being mounted upon said pivot pins, are, of course, disposed concentrically therewith.

The movable feed-dog 6 slides between the rocker member 4 and the cover plate 11 and is provided with bearing surfaces 24 and 25 which are concentric with the escapement wheel 7. The inner concentrically disposed bearing surface 24 runs upon rollers 22 and 23, and the outer of said concentric bearing surfaces 25 rides upon a roller 26 mounted upon a pin 27 extended between rocker member 4 and cover plate 11. When feed-dog 6 is moved upon these rollers, the same moves concentrically with the axis of the escapement wheel, and the tooth or pallet 28 thereof also moves concentrically and, therefore, when engaged with a tooth of the escapement wheel does not slide thereon, but is maintained in fixed relation with said tooth during the rotation of the escapement wheel, therefore eliminating any friction between those parts.

Feed-dog 6, upon its rear portion, is provided with a wiper cam surface 30; at the ends of this cam surface are formed cam stop portions 31, and 32, the cam path merging into these cam portions along stop curve portions 33 and 34. The feed-dog 6 is actuated by the roller 35, best shown in Fig. 14, which is carried upon a spring plunger 36 which slides in a casing 37 provided upon the rocker member, said plunger being pressed forward by means of a spring 38 interposed between said plunger and an adjusting screw 40 threaded into the casing and held in adjusted position therein, as by means of a lock nut 41. The pressure of roller 35 upon cam surface serves to force the movable dog 6 in a direction opposite to that in which the escapement wheel tends to turn, so as to move the dog from the position shown in Fig. 1 to that shown in Fig. 9, in which latter position the movable dog is held by the engagement of the roller 35 with the curved stop portion. Curve portion 33 is struck upon an arc of greater radius than that of roller 35, so that the dog is brought to a position of rest gradually and in a noiseless manner.

The pallet 28 of the movable dog 6 has the edge thereof curved or beveled as at 42 where the tooth of the escapement wheel slips from it when rocker member 4 is vibrated to engage the fixed dog with said escapement wheel, and the side of the pallet adjacent the fixed dog is preferably beveled as at 43. The object of this construction is to allow the tooth of the escapement wheel to start its motion gradually as it is released from the movable dog, and prevents the dog from snapping sharply back with a click as the same is released.

Having thus described this embodiment of my invention, the operation thereof may now be understood. With the parts in normal position, as shown in Figs. 1 to 3, inclusive, a tooth 44 of the escapement wheel is resting in contact with the pallet 28 of the movable dog. When the rocker member 4 is raised, the tooth 44 of the escapement wheel gradually slides over the curved releasing edge 42 of the movable dog, as in Figs. 4 and 5, and, as the rocker member is further raised, the tooth 44 slides along the incline 43 of the feed-dog which is being moved in position to engage the oncoming tooth 45 of the escapement wheel until tooth 44 is engaged by the detaining dog 5. The above operation is illustrated in Figs. 6, 7 and 8 of the drawings, and at this point, it may be noted that a slight drop is preferably provided between the movable dog and the fixed dog, the construction above described, however, providing for a drop of the teeth of the escapement wheel from the movable to the fixed dog in gradual manner, and, therefore, without producing any noise. After the tooth 44 of the escapement wheel has been engaged by the fixed dog 5, a further movement of the rocker member 4 allows pallet 28 to slide back along the incline 43 until it is entirely released from tooth 44 and is carried backward to the positions shown in Figs. 9, 10 and 11 of the drawings by the roll 35 which engages the cam path 30 thereof. When rocker member 4 is depressed, the next tooth 45 of the escapement wheel engages with the pallet 28 of the movable dog and forces the same backward, compressing spring 38 until roller 35 reaches the stop curve 34 upon the movable dog which has a radius slightly greater than that of roller 35 and so gradually arrests the motion of the dog and, through said dog, arresting the rotation of the escapement wheel, the parts again coming into the position shown in Fig. 1 with the escapement wheel resting, as usual, upon the movable dog. The point to which roller 35 moves on the stop curve 34 and, therefore, the position in which the feed-dog is arrested, may be determined by adjusting the tension of the spring 38 through the adjusting screw. When the back-spacing mechanism is actuated to rotate the escapement wheel in a reverse direction, the movable dog 6 is first moved into the position shown in Fig. 9 of the drawings, and is then forced outwardly by the tooth 46 of the escapement wheel, the dog pivoting about roller 22 and compressing the spring 38, these positions of the parts being shown in Figs. 12 and 13 of the drawings. As the tooth 46 of the escapement wheel escapes the pallet 28 of the movable dog, the latter drops back in front of said tooth, the position of the pallet being in all respects similar to that shown in Fig. 9.

In the embodiment of my invention shown in Figs. 17 to 22, inclusive, the movable dog 6 which is slotted as at 47 rides on the rollers 22 and 23, the bearing surfaces 48 and 50 being concentric with the axis of the escapement wheel, as in the embodiment first above described. In this instance, the movable dog carries a roller 51 which is engaged by a wiper cam 52 pivoted at 53 to the rocker member, said wiper cam having stop curves 54 and 55, and is pressed toward roller 51 by spring 56, the tension of which may be adjusted by means of a movable plate 57 and a screw 58 which supports one end of said spring. The function of this wiper cam is to force the movable dog in a direction opposite to that in which the escapement wheel turns until the roller 51 enters stop curve 55, whereupon the movement of the dog is gradually and silently arrested. In Figs. 17 to 19, the parts of this embodiment of the escapement are in normal positions, with the movable dog pressed backward by the tooth of the escapement wheel adjacent the fixed dog and the roller 51 has ridden upon the curve 54 of the wiper cam until brought to a gradual stop. The exact point at which the roller is arrested by the curve 54 may be regulated by adjusting spring 56. As the rocker member 4 is raised, the pallet 38 of the movable dog slips over the tooth 44 of the escapement wheel and is then forced back into position to receive the next tooth 45 by means of the spring 56 and the wiper cam 52, the stop curve 55 of the cam bringing the dog to a gradual stop. Figs. 20, 21 and 22 illustrate the parts in the last-mentioned positions. In this instance, the tooth of the movable dog is provided with a squared releasing edge. Said dog may, however, be provided with the curved or inclined form of edge if desired.

It will accordingly be seen that I have provided mechanism well adapted to attain, among others, the ends and objects above enumerated in an exceedingly simple yet efficient manner. In each embodiment of the invention above described, comparatively few parts are employed and there is, therefore, little likelihood of the mechanism becoming easily deranged. The loose feed-dog may be readily removed from the vibratory rocker by compressing the actuating spring plunger to a sufficient degree to allow the end 60 thereof to be withdrawn between rollers 22 and 26. Another advantage inherent in the present construction is that the position of the movable dog with relation to the teeth of the escapement wheel, or to the fixed dog may be conveniently regulated by merely manipulating the spring actuating devices.

It will be observed that, inasmuch as no impact or concussion of movable parts takes place in the escapement mechanism, no noise whatever can be produced, and yet the parts will be positively and gradually arrested in their proper positions.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention what I claim as new and desire to secure by Letters Patent is:

1. The combination in an escapement mechanism, of a spaced member, a rocker member provided with a fixed and a loosely mounted feed-dog, the latter moving concentrically with the axis of the spaced member, and means independent of said movable dog for positioning the same.

2. In an escapement mechanism, the combination with a spaced member, of a member carrying a fixed and a loosely mounted feed-dog, the latter being concentrically movable with the axis of said spaced member, and spring-actuated means independent of said loosely mounted dog adapted to position the same.

3. In an escapement mechanism, the combination with a spaced member, of a rocker member provided with a fixed detaining dog and a loosely mounted feed-dog movable concentrically with the spaced member which effect a spacing of said spaced member when said rocker member is actuated, and a spring-pressed member engaging said feed-dog, but independent thereof, adapted to position the same.

4. In a typewriting machine, in combination, a member adapted to be spaced, means for effecting a spacing thereof, comprising a rocker member provided with a fixed dog and a loosely mounted movable feed-dog moving in an arc concentric with the member adapted to be spaced, which is adapted to be engaged with said member when said rocker member is actuated, means for confining said feed-dog upon said rocker member, and spring-actuated means independent thereof adapted to position the same.

5. In a typewriting machine, the combination with a member adapted to be spaced, of spacing means therefor, comprising a rocker member carrying a fixed detaining dog and a curved loosely mounted feed-dog, the latter of which is adapted to be engaged with the spaced member and slid thereby into adjacency with said detaining dog, and movable cam means mounted upon said rocker member for arresting said feed-dog in such position.

6. In a typewriting machine, the combination with a member to be spaced, of spacing means therefor, comprising a vibratory dog holder carrying a fixed detaining dog and a loosely mounted feed-dog adapted to move concentrically about the axis of said spaced member, the latter of which is adapted to be engaged with said spaced member and moved thereby to be arrested substantially in line with the detaining dog, and means mounted upon said rocker member for arresting said feed-dog in such position.

7. In an escapement mechanism, the combination with a part to be spaced, of spacing means therefor, comprising a vibratory dog carrying member having a detaining dog fixed thereon and a feed-dog mounted thereon and movable concentrically with respect to the part to be spaced and adapted, when engaged with said member to be spaced, to be moved thereby to a position adjacent the fixed dog, and a movable member mounted upon said vibratory member adapted to arrest a movement of the feed-dog when it has been moved to a position adjacent the detaining dog.

8. In an escapement mechanism, the combination with a part to be spaced, of spacing means therefor, comprising a vibratory dog carrier, a fixed dog mounted thereon, a loosely mounted dog carried thereby which is movable concentrically with the axis of the part to be spaced, movable means carried by the dog carrier which coöperates with said feed-dog to arrest a movement of the same, one of said parts being provided with a cam surface which coöperates with the other thereof to arrest a movement of the feed-dog when the same has been engaged with the member to be spaced and moved thereby.

9. In an escapement mechanism, the combination, of a vibratory dog carrier, a feed-dog loosely mounted thereon and having a pair of spaced cam projections and a cam path extended between said projections, and movable means mounted upon said dog-carrier, adapted to traverse said cam path to move the said dog and to engage said projections to arrest a movement thereof in either direction without impact or concussion.

10. In an escapement mechanism, the combination, of a member to be spaced, a rocker member, a feed-dog loosely mounted thereon and capable of occupying different positions concentrically with the axis of said spaced member, and cam stop mechanism for limiting the movement thereof in such positions.

11. In an escapement mechanism, the combination, of a member to be spaced, a rocker member, a feed-dog loosely mounted thereon and capable of occupying different positions concentric with the axis of the member to be spaced, said feed-dog being provided with a cam path, and spring-actuated means mounted upon said rocker member adapted to traverse said cam path as the dog is moved to position said dog with respect to the member to be spaced.

12. In an escapement mechanism the combination of a spaced member, a rocker member provided with a fixed feed-dog, a feed-dog loosely mounted thereon and capable of occupying different positions, said feed-dog being provided with a cam portion and a spring-pressed plunger provided with a roller which traverses said cam portion to move said dog, and means formed upon said dog, with which said roller engages to limit the movement of said dog in either direction.

13. In an escapement mechanism, the combination of a spaced member, a rocker member provided with a fixed detaining dog, a feed-dog loosely mounted upon said spaced member and having a portion thereof formed concentrically with the axis of said spaced member, means upon said rocker member with which the concentrically formed portion of said feed-dog engages and upon which the latter rides, said feed-dog being provided with a cam portion and a rotatively mounted spring-pressed member which engages said cam portion to move said dog and to position the same with respect to said spaced member.

14. In an escapement mechanism for typewriting machines, the combination, of an escapement wheel adapted to be connected with the part to be spaced, a vibratory member provided with a fixed detaining dog, a loosely mounted dog carried by said vibratory member and adapted to move thereon concentrically with the axis of said escapement wheel and adapted, when engaged with said escapement wheel, to be moved thereby into adjacency with said fixed dog, said dog being provided with a cam path, and a spring-pressed member adapted to engage said cam path to move said dog and position the same with respect to the teeth of said escapement wheel.

15. In an escapement mechanism for typewriting machines, the combination of an escapement wheel adapted to be connected with a part to be spaced, a vibratory member provided with a fixed detaining dog, a loosely mounted dog carried by said vibratory member, means for guiding said dog, whereby the same moves upon said dog carrier concentrically with the axis of said escapement wheel, and cam means for moving said dog into position to engage a tooth of said wheel and for arresting said dog in such position.

16. In an escapement mechanism for typewriting machines, the combination, of a vibratory dog carrier carrying a fixed detaining dog, and a movable feed-dog, said feed-dog being provided with a cam path and having a cam portion disposed at either end of said cam path, a spring-pressed plunger provided with a roller mounted upon said dog carrier, said roller engaging said cam path to move said dog into position to engage a tooth to move said dog in one direction, and engaging one of said cam projections to arrest the same in such position, said roller being adapted to engage the other of said cam projections and arrest the movement of said dog when the same is moved in an opposite direction.

17. In an escapement mechanism for typewriting machines the combination, of an escapement wheel adapted to be operatively connected with the part to be spaced, a vibratory dog carrier, a fixed detaining feed-dog mounted thereon, a feed-dog mounted upon said dog carrier and movable thereon concentrically with the axis of said escapement wheel, rollers mounted upon said escapement wheel upon which said dog travels and which operate to guide the same, said dog being provided with a cam path and having a plurality of oppositely disposed cam portions, a spring-pressed plunger mounted upon said dog holder and provided with a roller which is adapted to traverse said cam path, whereby said dog will be moved in one direction to position the same with respect to the teeth of said escapement wheel, said roller being adapted to engage said cam path and arrest the movement of said dog when the latter has been engaged with the teeth of said escapement wheel and moved into adjacency with the fixed dog.

18. In a typewriting machine, the combination with the escapement wheel adapted to be connected with a part to be spaced, of a vibratory dog carrier, a fixed detaining dog mounted thereon, a plurality of guide rollers carried by said dog carrier, a movable feed-dog interposed between said guide rollers and adapted to ride thereon, said feed-dog being provided with a pair of cam projections between which is interposed a cam path, a spring-pressed plunger having a roller coöperating with said cam path to move said dog and coöperating with said cam projections to arrest the movements of said dog in either direction without impact or concussion.

19. In a typewriting machine, the combination with an escapement wheel adapted to be connected with a part to be spaced, of a vibratory dog carrier provided with a fixed detaining dog, a feed-dog loosely mounted upon said dog carrier, having oppositely located portions disposed concentrically with the axis of said escapement wheel, a plurality of guide members mounted upon said escapement wheel and engaging said concentrically disposed portions, said feed-dog being provided with a cam path and a cam projection located at either end of said cam path and into which said cam path merges, a spring-pressed plunger mounted upon said dog carrier, a roller carried by said plunger and traversing said cam path to move said dog into position to engage with one of the teeth of said escapement wheel, the engagement of said roller with the cam projection at one end of said cam path being adapted to arrest the movement of said dog when moved to such position, said feed-dog, when engaged with a tooth of said escapement wheel, being adapted to be moved in an opposite direction, whereby said roller traverses said cam path as the dog is moved and engages the other of said cam projections whereby the movement of said dog is arrested.

In testimony whereof I affix my signature, in the presence of two witnesses.

NILS H. ANDERSON.

Witnesses:
C. H. WILSON,
H. M. SEAMANS.